(12) United States Patent
Singur

(10) Patent No.: US 9,446,909 B2
(45) Date of Patent: Sep. 20, 2016

(54) CONTAINER GRIPPER AND TRANSPORTING ELEMENT WITH SUCH CONTAINER GRIPPERS

(71) Applicant: KHS GmbH, Dortmund (DE)

(72) Inventor: Igor Singur, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/421,550

(22) PCT Filed: Aug. 7, 2013

(86) PCT No.: PCT/EP2013/002359
§ 371 (c)(1),
(2) Date: Feb. 13, 2015

(87) PCT Pub. No.: WO2014/026747
PCT Pub. Date: Feb. 20, 2014

(65) Prior Publication Data
US 2015/0217947 A1    Aug. 6, 2015

(30) Foreign Application Priority Data

Aug. 13, 2012    (DE) .................. 10 2012 015 886

(51) Int. Cl.
*B65G 47/84*    (2006.01)
*B65G 47/86*    (2006.01)
*B65G 47/90*    (2006.01)

(52) U.S. Cl.
CPC ........... *B65G 47/847* (2013.01); *B65G 47/908* (2013.01); *B65G 2201/0247* (2013.01)

(58) Field of Classification Search
CPC .............. B65G 2201/0247; B65G 2201/0252; B65G 47/847; B25B 9/04

USPC .......................................... 198/470.1, 468.2
See application file for complete search history.

(56) References Cited

U.S. PATENT DOCUMENTS

| | | | | |
|---|---|---|---|---|
| 4,858,980 | A * | 8/1989 | Dreisig | B23Q 3/15526 24/545 |
| 8,672,376 | B1 * | 3/2014 | Wilson | B25J 15/0028 294/116 |
| 2002/0079714 | A1 * | 6/2002 | Soucy | H01L 21/68707 294/99.1 |
| 2006/0043749 | A1 * | 3/2006 | Huang | B25J 7/00 294/99.1 |
| 2011/0109110 | A1 | 5/2011 | Sarda | |

FOREIGN PATENT DOCUMENTS

| | | |
|---|---|---|
| CN | 201143682 | 11/2008 |
| DE | 200 20 457 | 11/2001 |
| DE | 10247362 | 4/2004 |
| DE | 10 2008 019 766 | 4/2009 |
| DE | 10 2009 018 733 | 11/2010 |
| DE | 10 2010 005 673 | 7/2011 |
| JP | 2001-287795 | 10/2001 |
| WO | WO2009/118579 | 10/2009 |

* cited by examiner

*Primary Examiner* — James R Bidwell
(74) *Attorney, Agent, or Firm* — Occhiuti & Rohlicek LLP

(57) ABSTRACT

A one-piece container gripper for suspending containers from a container region beneath a container mouth has segments, a locking portion, and a spring portion. On a front side of the container gripper, the segments define a container mount between them. The spring portion exerts a closing force pre-stressing the segments, thus urging the container mount to close. The segments can be moved apart against a spring-exerted closing force to open the gripper. The locking portion, which is integral with the container gripper, moves resiliently between a position that locks the gripper and a position that unlocks it.

12 Claims, 4 Drawing Sheets

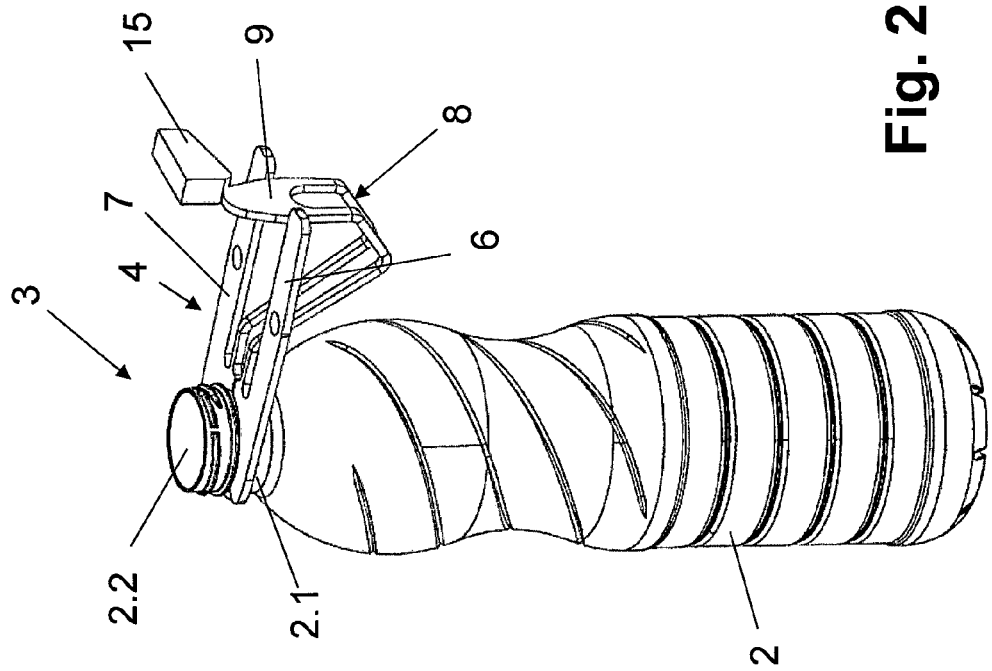
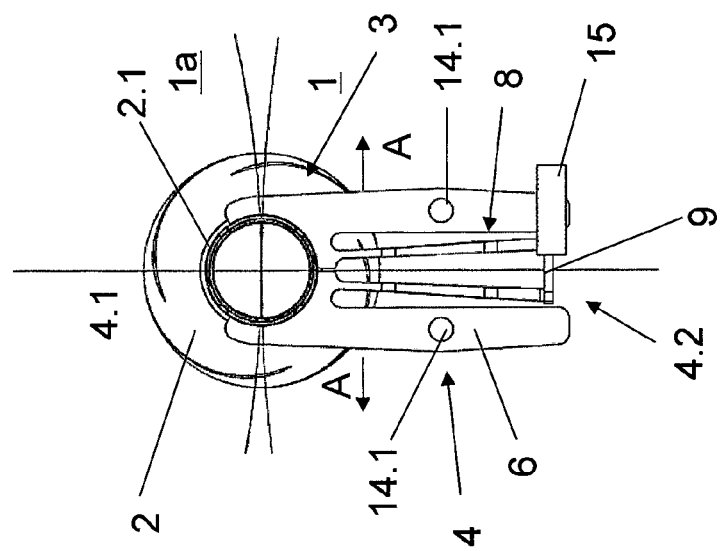

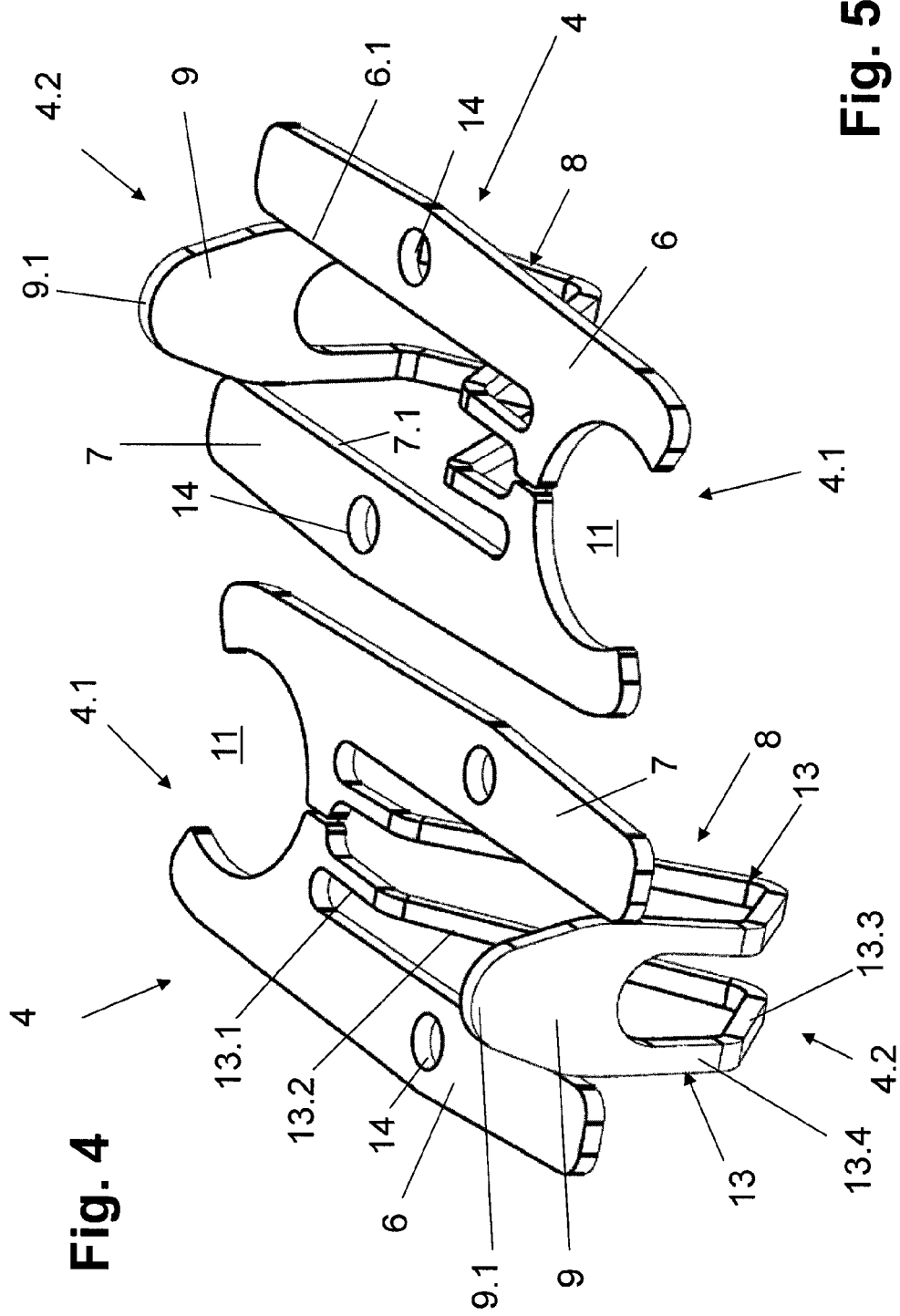

US 9,446,909 B2

CONTAINER GRIPPER AND TRANSPORTING ELEMENT WITH SUCH CONTAINER GRIPPERS

RELATED APPLICATIONS

This application is the national stage entry under 35 USC 371 of PCT/EP2013/002359, filed on Aug. 7, 2013, which claims the benefit of the Aug. 13, 2012 priority date of DE 102012015886.6, the content of which is herein incorporated by reference.

FIELD OF DISCLOSURE

The invention relates to container processing, and in particular, to gripping a container.

BACKGROUND

Transporting elements, such as starwheels, are often used to transport containers in container treatment machines. These transporting elements often use container grippers to suspend containers vertically. The container grippers typically engage a container at a container region directly beneath the container mouth. In the case of a bottle, this container region is a neck ring.

Among the advantages of this gripping method are that containers that differ considerably in terms of shape and size can be still be transported by the same transporting element or by the container grippers thereon without having to perform any structural modifications, such as exchanging a container guide and/or format parts. The sole requirement is that the containers each have the same configuration at the container region beneath the container mouth.

In practice, however, it has been found that known customary container grippers are often not suitable for securely holding and transporting filled containers. The difficulty arises because a filled container is very heavy. This means that when the transporting element rotates very fast, there will be high centrifugal forces exerted on the containers. Because the containers are so heavy, these forces can tear the containers out of the container grippers.

On known solution to this problem is to configure the container grippers such that the container mounts thereof at least partially enclose the container portion at a radially outer region in relation to the rotation axis or machine axis of the transporting element. However, such container grippers are mechanically complicated and expensive.

Also known are container grippers having two gripper arms formed by legs of a clip-like gripper element and that form, between them a container holding region. Control cams that cooperate with the gripper arms are provided on the rotating transporting element. These control cams open and close the container grippers.

SUMMARY

An object of the invention is to provide a container gripper that can be manufactured in a particularly inexpensive manner.

In one aspect, the invention features a container gripper that is manufactured in one piece with all the elements necessary for the functioning thereof. In particular, the container gripper is manufactured with at least two flat arms or segments that form the container mount, with at least one spring portion that generates a resilient closing or clamping force, and preferably also with a locking portion. The locking portion is movable resiliently between a position that locks the container gripper with a form fit in order to prevent the gripper from opening, and a position that releases the container gripper, counter to a spring force, to allow the gripper to open. In the initial state of the container gripper, the locking portion is preferably in its locking state. The container gripper is thus a self-locking container clamp or bottle clamp.

In some embodiments, the container gripper is preferably made of a flat metal material with sufficient intrinsic elasticity. A suitable material is stainless steel, for example of stainless steel having the steel number 1.4310. The container gripper is made by punching and/or cutting out (including laser cutting) and bending.

Significant advantages of the container gripper according to the invention include its low manufacturing cost, its avoidance of compression springs and tension springs as well as additional joints, its avoidance of having to use additional format parts tailored to different containers, its avoidance of regions that are difficult to access, and hence to clean, and its ability to reliably transport containers of considerable weight that are subjected to high centrifugal forces.

The use of stainless steel, in particular, promotes corrosion resistance. This is useful because the container gripper is periodically exposed to cleaning and/or sterilizing media. This typically occurs during aseptic bottling, during cleaning and/or disinfecting the containers, and also during cleaning and/or disinfecting the transporting elements. One such cleaning and/or sterilizing medium to which the container gripper is periodically exposed is hydrogen peroxide ($H_2O_2$).

In another aspect, the invention features an apparatus for handling containers. Such an apparatus includes a one-piece container gripper for suspending containers from a container region beneath a container mouth. The container gripper comprises first and second arms or segments, a container mount, a locking portion, and a spring portion. On a front side of the container gripper, the first and the second segments define the container mount between them. The container mount transitions between a closed position and an open position. The spring portion exerts a closing force to pre-stress the segments, thus urging the container mount to transition into the closed position. The segments can be moved apart from one another counter to a closing force exerted by the spring portion. This causes the container mount to transition into the open position from the closed position. The locking portion, which is integral with the container gripper, moves resiliently between a first position, in which the container gripper is locked, and a second position, in which the container gripper is unlocked.

In some embodiments, the spring portion comprises a clip. Among these are embodiments in which the spring portion comprises legs that are bent to cause the spring portion to assume a hooked profile. These legs extend through a space between the first and second segments. The legs extend between a locking tab that forms the locking portion and the container mount. A distance between the spring portion and each of the segments increases monotonically along the legs. The distance reaches a maximum at a point on the spring portion that is most remote from the container mount.

In another embodiment, the spring portion again comprises a clip. In this embodiment, the spring portion also comprises first and second legs. At a first end thereof, the first leg merges into an inner side of the first segment. At a first end thereof, the second leg also merges into an inner side of the second segment. The inner sides of the first and second segments face each other.

In another embodiment, the spring portion again comprises a clip. This embodiment further comprises a locking tab that forms the locking portion. The locking tab has a free end and tapers towards this free end. In the locking position, the locking tab bears, with an edge thereof, against mutually facing inner surfaces or edges of the segments.

In another embodiment, the spring portion is arranged between the first segment and the second segment.

In additional embodiments, the first segment and second segments are configured for pivotal attachment to a transporting element.

In yet other embodiments, the spring portion merges into the first and second segments on the front side of the container gripper where the first and the second segment define the container mount therebetween.

Embodiments include those in which the segments are flat, and those in which the segments comprise flat levers.

Other embodiments also include a transporting element for transporting containers. Such a transporting element comprises a plurality of transport positions, with the container gripper being one of a plurality of identical container grippers, each of which is on a corresponding one of the transport positions.

Another embodiment has means for moving the locking portion into a non-locking state. The means for moving the locking portion is disposed at a handover region at which a container handover takes place. The container handover is either a location at which engagement of a container at a transport position takes place or a location at which removal of a container from a transport position takes place. In some embodiments, the means for moving comprises a ramp.

In yet another aspect, the invention features a one-piece container gripper for suspending containers from a container region beneath a container mouth has segments, a locking portion, and a spring portion. On a front side of the container gripper, the segments define a container mount between them. The spring portion exerts a closing force pre-stressing the segments, thus urging the container mount to close. The segments can be moved apart against a spring-exerted closing force to open the gripper. The locking portion, which is integral with the container gripper, moves resiliently between a position that locks the gripper and a position that unlocks it.

As used herein, "substantially" or "approximately" mean deviations of ±10%, preferably ±5%, from the exact value in each case and/or deviations in the form of changes that do not affect the function.

Further developments, advantages and possible uses of the invention will become apparent from the following description of examples of embodiments and from the figures. All the features described and/or shown in the figures, per se or in any combination, form in principle the subject matter of the invention, regardless of the way in which they are combined or refer back to one another in the claims. The content of the claims also forms part of the description.

BRIEF DESCRIPTION OF THE FIGURES

These and other features will be apparent from the following detailed description and the accompanying figures, in which:

FIG. 1 is a simplified partial view and plan view of a rotating disc-like or rotor-like transporting element together with one of the container grippers thereon and a container suspended from the gripper;

FIG. 2 is a perspective view of the container gripper and the container held thereon;

FIGS. 4 and 5 are perspective detail views of the container gripper from different viewing directions;

DETAILED DESCRIPTION

Figure 3:
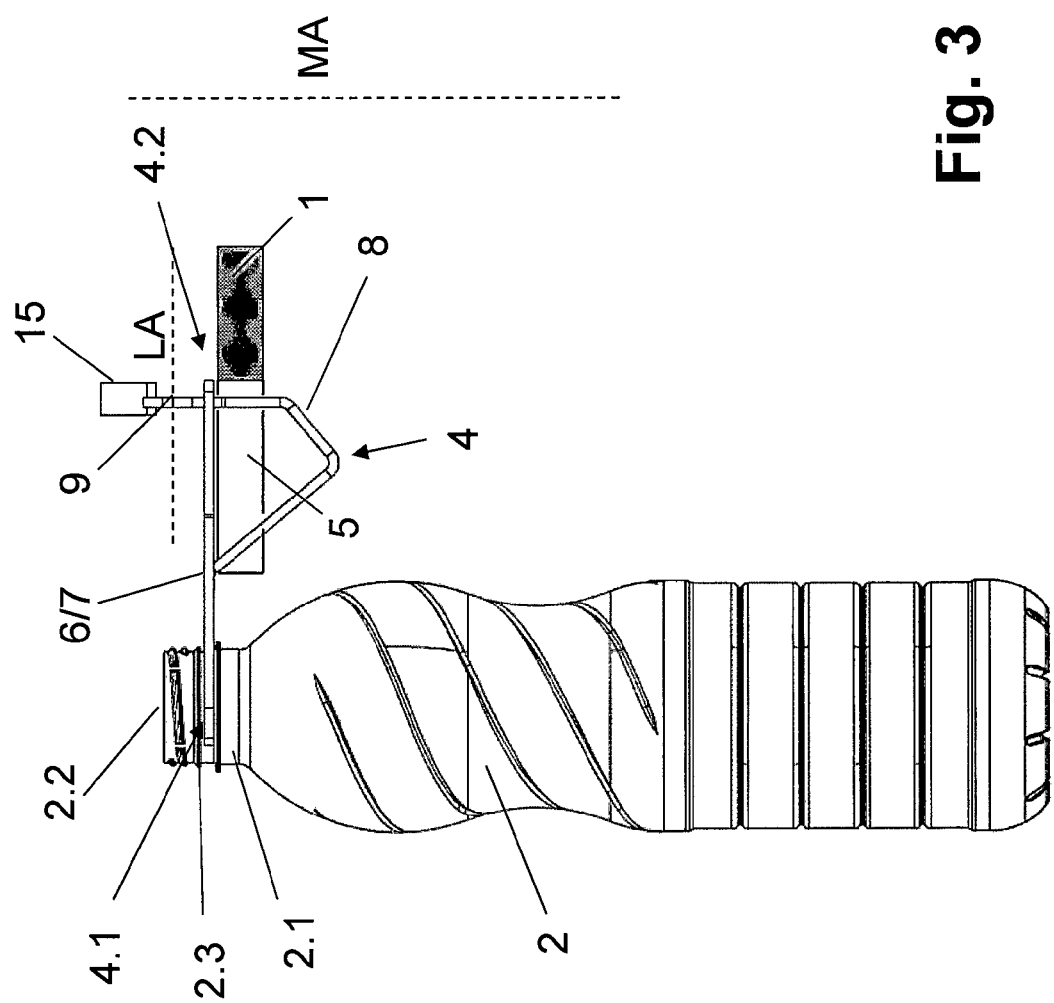
FIG. 3 is a side view of the transporting element together with the container gripper and with a container suspended therefrom.

FIG. 1 shows a disc-like or rotor-like first transporting element 1 of a container treatment machine or of a system for treating containers 2. The container can be bottles, such as plastic bottles, and in particular, PET bottles. The first transporting element 1 can be driven to rotate about a vertical machine axis MA, best seen in FIG. 3.

The first transporting element 1 forms, on its circumference, a plurality of transport positions 3. The transport positions 3 are either transport positions that do nothing but transport, such as those of a container transport system, or transport positions at which treatment is also carried out, such as the treatment positions of a container-treatment machine.

The transport positions 3 are provided on the circumference of the first transporting element 1 at equal angular spacings around the vertical machine axis MA of the first transporting element 1 and at the same radial distance from the machine axis MA. Each transport position 3 has at least one container gripper 4 for receiving and suspending a container 2 from a container region 2.1 thereof. The container region 2.1 is located at a small distance beneath a container mouth 2.2 and has a reduced external cross-section. When the containers 2 are bottles, the container region 2.1 is the neck or mouth region having a mouth flange, or neck ring 2.3.

Each container gripper 4 has resilient tongs or a clamp. The containers 2 are supplied, for example, by a second transporting element 1a. Each container 2 is pushed laterally, i.e. radially or substantially radially with respect to the machine axis MA, so that its container region 2.1 engages a container gripper 4 of the first transporting element 1 at a handover region between the first and second transporting elements 1, 1a. At the end of the transport path formed by the first transporting element 1, the container 2 can be removed again radially or substantially radially from the container gripper 4 at a further handover region.

In either case, the act of pushing-in and removing the container 2 takes place against the resilient clamping force that clamps the containers 2 at their container region 2.1. The container gripper 4 is furthermore designed such that, once a container 2 has been pushed in, it is locked rigidly or with a form fit to prevent opening. As a result, containers 2 of considerable weight are securely held at the respective transport position 3, even in the case of a rapidly rotating first transporting element 1.

The container gripper 4 is produced in one piece with two elongate or lever-like first and second segments 6, 7 and with one clip-like spring portion 8 that forms a locking tab 9 at one end. A central plane ME is oriented to be perpendicular to the surface sides of the flat first and second segments 6, 7. In the illustrated embodiment, the container gripper 4 is mirror-symmetrical about the central plane ME.

When the container gripper 4 is in a mounted state, the central plane ME is also oriented radially with respect to the machine axis MA of the first transporting element 1 and includes the machine axis MA.

The two segments 6, 7 are flat and are arranged with their surface sides in a plane that is perpendicular to the central plane ME. With the container gripper 4 mounted on the first transporting element 1, the segments 6, 7 are perpendicular to the machine axis MA.

The first and second segments 6, 7, which are spaced apart from one another, each extend in the direction of a longitudinal axis LA running in the central plane ME between a front side 4.1 and a rear side 4.2 of the container gripper 4.

At the front side 4.1 of the container gripper 4, the first and second segments 6, 7 have concave edge regions 10 on their mutually facing inner sides. These concave edge regions 10 cooperate to form a container mount 11 that is open at the front side 4.1.

The container mount 11 holds a container 2 at a transport position 3. In particular, the container mount 11 engages the container region 2.1 of the container 2 and encloses it with the first and second segments 6, 7 over a circumferential region somewhat greater than 180°.

The first and second segments 6, 7 are spaced apart from one another over most of their length extending in the direction of a longitudinal axis LA and in particular also at the rear side 4.2 of the container gripper 4. The first and second segments 6, 7 each have an inwardly running portion 12 in the vicinity of the container mount 11. The concave edge regions 10 are formed on the inwardly running portions 12.

In a normal state, i.e. in an un-cocked state of the container gripper 4, the inwardly running portions 12 are at only a small distance from one another. At the two inwardly running portions 12, the two segments 6, 7 each merge into one of two legs 13 of the clip-like spring portion 8, namely on the side of the portions 12 remote from the container mount 11.

The two legs 13, which are arranged on either side of the central plane ME, are angled multiple times so that the spring portion 8 is shaped in the manner of a hook when viewed perpendicular to the central plane ME and thus protrudes beyond one side, i.e. beyond the underside, of the container gripper 4.

Each leg 13 has, starting from the portion 12, a first leg portion 13.1, a second leg portion 13.2, a third leg portion 13.3, and a fourth leg portion 13.4. The first leg portion 13.1 lies with its upper side and underside in the corresponding plane of the first and second segments 6, 7. The second leg portion 13.2 runs obliquely downwards and towards the rear side 4.2. The third leg portion 13.3 runs obliquely upwards. At the rear side 4.2, a fourth leg portion 13.4 runs vertically or substantially vertically upwards and that then merges into the locking tab 9 that joins the two legs 13 at that point.

Starting from the first leg portion 13.1 and heading towards the third leg portion 13.3, the second leg portions 13.2 are at an increasingly large distance from the plane of the segments 6, 7. Starting from the second leg portion 13.2 and heading towards the fourth leg portion 13.4, the third leg portions 13.3 are at an increasingly small distance from the plane of the first and second segments 6, 7. The fourth leg portions 13.4 thus extend perpendicular or substantially perpendicular to the plane of the first and second segments 6, 7. However, it will be understood that the hook shape of the spring portion 8 can also be achieved if the legs 13 are curved continuously or substantially continuously in a manner following the profile of the leg portions 13.1-13.4.

Figure 6:
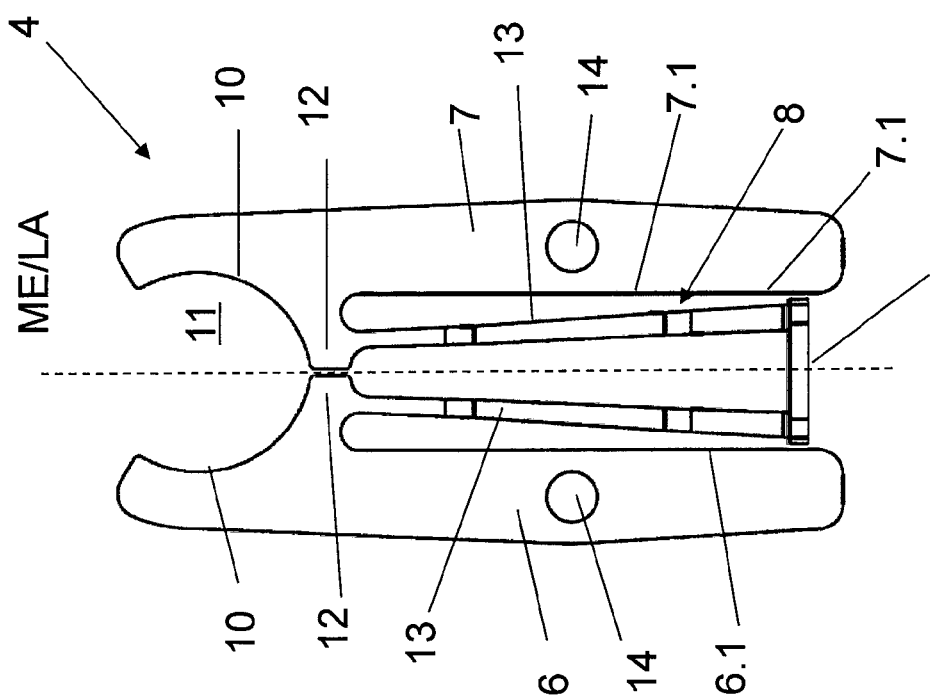
FIG. 6 is a plan view of a container gripper in plan view.

As shown in particular in FIGS. 5 and 6, in the normal state of the container gripper 4, the locking tab 9 which protrudes beyond the other side, i.e. beyond the upper side, of the container gripper 4, is oriented with its surface sides perpendicular or substantially perpendicular to the longitudinal axis LA. The locking tab 9 is arranged such that it bears at the rear side 4.2 with its edge against mutually facing inner sides or edges 6.1, 7.1 of the first and second segments 6, 7. The inner sides or edges 6.1, 7.1 thus form locking faces. Furthermore, the locking tab 9 tapers towards a free end 9.1 that is remote from the fourth leg portions 13.4.

Each of the first and second segments 6, 7 has a bore 14, in the portion between the container mount 11 and the rear side 4.2. In the illustrated embodiment, each bore 14 is at a smaller distance from the rear side 4.2 than from the front side 4.1.

As a result of the clip-like spring portion 8, the container gripper 4 is pre-stressed into the closed state of its container mount 11. Using suitable pins or screws 14.1, the first and second segments 6, 7 are each pivotably connected to the first transporting element 1 at their respective bores 14 such that the first and second segments 6, 7 can be moved apart from one another, as indicated by the arrows A in FIG. 1. This movement can either push the container 2 into the container mount 11 or remove it from the container mount 11. The movement thus opens the container gripper 4 counter to the action of the spring force generated by the spring portion 8.

The mounting of the container grippers 4 in the region of cutouts 5 at the edge of the first transporting element 1 takes place in such a way that the locking tabs 9 protrude beyond the upper side of the container grippers 4 remote from the second, third, and fourth leg portions 13.2-13.4.

In the normal state of each container gripper 4, the first and second segments 6, 7 thereof are rigidly locked by the locking tab 9 as it bears against the inner edges 6.1, 7.1. This makes it essentially impossible to open the container mount 11.

Figure 7:
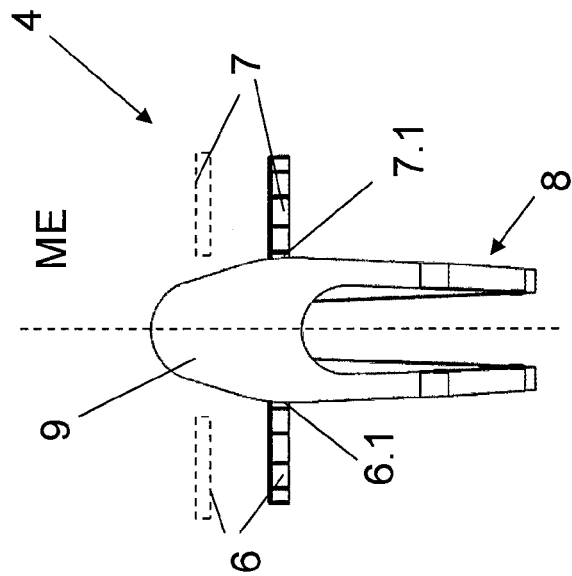
FIG. 7 is a rear view of the container gripper, partially in section.

To push the container 2 into a container gripper 4 and remove it from a container gripper 4, the locking tab 9 of the latter is pressed downwards under elastic deformation of the spring portion 8. This causes the locking tab 9 to release the two segments 6, 7 for pivoting, thus opening the container mount 11, as indicated by dashed lines in FIG. 7.

An actuating element is provided against which the respective locking tab 9 runs with its upper end 9.1. Examples of suitable actuating elements are a cam and a wedge 15. The actuating element can be placed, for example, at a handover position at which a container is pushed into or removed from the container gripper.

Other control or actuating elements for moving the locking tab 9 out of the locking state and into the non-locking state are also possible. Examples of such locking elements include piston/cylinder arrangements.

The container gripper 4, including the locking tab 9 described above, is produced in one piece. Production takes place preferably by cutting out or punching and bending from an elastically deformable flat material. A suitable material having such properties is metal. Examples of a suitable metal include elastically deformable stainless steel, such stainless steel having the number 1.4310.

In one embodiment, the clip-like spring portion 8 generates a spring force that moves or returns the segments 6, 7 such that the segments 6, 7 in the closed state are not pre-stressed against one another. In this embodiment, a spring force is created only when the clip-like spring portion 8 is elastically deformed as a result of the segments 6, 7 moving apart, for example when a container is inserted into the clamp.

In a further embodiment, the clip-like spring portion 8 generates a spring force that pre-stresses the container mount 11 even in its closed state.

The clip-like spring portion 8 cooperates simultaneously with the locking tab 9 to lock the container mount 11. It also makes it possible to move the locking tab 9 out of the locking position and into the non-locking position counter to the spring action.

The invention has been described above on the basis of an exemplary embodiment. It will be understood that numerous changes and modifications are possible without thereby departing from the inventive concept on which the invention is based. For instance, the transporting element may also be a transporting element differing from a rotor.

Having described the invention, and a preferred embodiment thereof, what is new and secured by letters patent is:

The invention claimed is:

1. An apparatus for handling containers, said apparatus comprising a one-piece container gripper for suspending containers from a container region beneath a container mouth, wherein said container gripper comprises a first segment, a container mount, a locking portion, a spring portion, and a second segment, wherein said container gripper has a front side and a back side, wherein, on said front side of said container gripper, said first and said second segment define said container mount therebetween, wherein said container mount has a closed position and an open position, wherein said container mount transitions between said closed position and said open position, wherein said spring portion exerts a closing force to pre-stress said first and second segments, thus urging said container mount to transition into said closed position, wherein said first and second segments can be moved apart from one another counter to action of said closing force exerted by said spring portion to cause said container mount to transition into said open position from said closed position, wherein said locking portion is integral with said container gripper, wherein said locking portion moves resiliently between a first position, in which said container gripper is locked, and a second position, in which said container gripper is unlocked, wherein said spring portion merges into said first segment, wherein said spring portion merges into said second segment on said front side of said container gripper, and wherein said first and said second segment define said container mount therebetween.

2. The apparatus of claim 1, wherein said spring portion comprises a clip.

3. The apparatus of claim 2, wherein said spring portion comprises first and second legs, wherein said legs are bent to cause said spring portion to assume a hooked profile, wherein said legs pass through a space between said first and second segments, wherein said legs extend between a locking tab that forms said locking portion and said container mount, wherein a distance between said spring portion and each of said segments increases monotonically along said legs, wherein said distance reaches a maximum at a point on said spring portion that is most remote from said container mount.

4. The apparatus of claim 2, wherein said first segment comprises an inner side and wherein said second segment comprises an inner side, wherein said inner side of said first segment faces said inner side of said second segment, wherein said spring portion comprises a first leg and a second leg, wherein, at a first end of said first leg, said first leg merges into said inner side of said first segment, wherein at a first end of said second leg, said second leg merges into an inner side of said second segment.

5. The apparatus of claim 2, further comprising a locking tab that forms said locking portion, wherein said locking tab has a free end, wherein said locking tab tapers towards said free end, wherein in said locking position, said locking tab bears with an edge thereof against mutually facing inner surfaces or edges of said segments.

6. The apparatus of claim 1, wherein said spring portion is arranged between said first segment and said second segment.

7. The apparatus of claim 1, wherein said first segment is configured for pivotal attachment to a transporting element, and said second segment is configured for pivotal attachment to said transporting element.

8. The apparatus of claim 1, wherein said segments are flat.

9. The apparatus of claim 1, wherein said segments comprise flat levers.

10. The apparatus of claim 1, further comprising a transporting element for transporting containers, wherein said transporting element comprises a plurality of transport positions, wherein said container gripper is one of a plurality of identical container grippers, wherein each of said transport positions comprises one of said container grippers.

11. The apparatus of claim 10, further comprising means for moving said locking portion into a non-locking state, wherein said means for moving said locking portion is disposed at a handover region at which a container handover takes place, said container handover being selected from engagement of a container at a transport position and removal of a container from a transport position.

12. The apparatus of claim 11, wherein said means for moving comprises a ramp.

* * * * *